United States Patent [19]

Arbabian

[11] 4,341,263
[45] Jul. 27, 1982

[54] WASTE WATER HEAT RECOVERY APPARATUS

[76] Inventor: Morteza Arbabian, P.O. Box 1270, Madison, Wis. 53701

[21] Appl. No.: 203,718

[22] Filed: Nov. 3, 1980

[51] Int. Cl.³ .............................................. F24H 3/00
[52] U.S. Cl. ..................................... 165/40; 165/47; 165/104.19; 165/DIG. 12; 237/8 R
[58] Field of Search ..................... 165/39, 40, 47, 140, 165/141, 104.19, DIG. 12, 156, 163; 237/8 R, 56

[56] References Cited

U.S. PATENT DOCUMENTS

| | | | |
|---|---|---|---|
| 2,399,985 | 5/1946 | Chandler | 237/8 |
| 2,418,446 | 4/1947 | Anderson | 165/140 X |
| 2,435,875 | 2/1948 | DeLore | 165/48 |
| 2,481,720 | 9/1949 | Campbell | 237/19 |
| 3,001,467 | 9/1961 | Stackler | 99/278 |
| 3,171,387 | 3/1965 | Muller | 122/33 |
| 3,341,122 | 9/1967 | Whittell | 237/8 |
| 3,669,184 | 6/1972 | Franzreb | 165/50 |
| 3,896,992 | 7/1975 | Borovina et al. | 237/19 |
| 3,958,555 | 5/1976 | Horne | 126/362 |
| 4,034,801 | 7/1977 | Bernstein | 165/48 |
| 4,084,745 | 4/1978 | Jones | 237/8 R |
| 4,109,858 | 8/1978 | Moses | 237/8 R |
| 4,114,686 | 9/1978 | Mueller et al. | 165/110 |
| 4,116,379 | 9/1978 | Movick | 165/1 X |
| 4,123,003 | 10/1978 | Winston | 62/2 X |
| 4,135,665 | 1/1979 | Nealy | 237/8 R |
| 4,136,731 | 1/1979 | DeBoer | 165/12 |
| 4,166,944 | 9/1979 | Scott | 126/351 X |
| 4,175,698 | 11/1979 | Brosenius | 237/19 |
| 4,176,788 | 12/1979 | Holman | 237/81 |
| 4,256,176 | 3/1981 | Cohen | 165/163 X |

FOREIGN PATENT DOCUMENTS

| | | | |
|---|---|---|---|
| 2447428 | 4/1975 | Fed. Rep. of Germany | 165/DIG. 12 |
| 2420867 | 11/1975 | Fed. Rep. of Germany | 165/DIG. 12 |
| 2440418 | 3/1976 | Fed. Rep. of Germany | 62/238.6 |
| 2517126 | 11/1976 | Fed. Rep. of Germany | 165/DIG. 12 |
| 2806029 | 8/1979 | Fed. Rep. of Germany | 165/DIG. 12 |

OTHER PUBLICATIONS

"Solar Energy: part II, The Continent," by A. A. Field, Heating and Air Conditioning, Mar. 1976.

Primary Examiner—Albert W. Davis
Assistant Examiner—Margaret A. Focarino
Attorney, Agent, or Firm—Isaksen, Lathrop, Esch, Hart & Clark

[57] ABSTRACT

Waste water heat transfer apparatus (10) is disclosed in which the waste hot water from residential or commercial uses such as washing, etc., is passed into a separate drain (24) and thence into a heat exchanger (17) which includes a waste water conduit (40) therein, and thence to the sewer drain (29). A supply water conduit (70) extends through the heat exchanger (17) generally paralleling the waste water conduit (40) and has fresh water run therethrough in a direction opposite to that of the flow of waste water to an outlet end, after which the supply water is provided to a water heater (20). The heat exchanger interior is filled with a heat transfer liquid (39), and is so divided by baffles (75, 76) that a temperature gradient is formed in the heat transfer liquid adjacent to the waste water conduit (40), with the liquid being warmest adjacent the inlet (68) of the waste water conduit and decreasing in temperature toward the outlet (69) of the conduit. The supply water, flowing in the opposite direction to that of the waste water, has its lowest temperature at its inlet end (71), which is adjacent the lowest temperature heat transfer liquid, and encounters progressively warmer adjacent heat transfer liquid as it rises upwardly in the heat exchanger toward its outlet end (72). A substantially constant temperature differential is thereby maintained throughout the heat exchanger between the waste water within the waste water conduit and the adjacent heat transfer liquid, and between the supply water in the supply water conduit and the adjacent heat transfer liquid. The transfer of a portion of the heat contained in the waste water to the supply water reduces the amount of energy that must be consumed by the water heater, and the system may also be tied to a hot water space heater (45) for a home or other building to preheat the water supplied to the boiler and thereby reduce the energy demand for space heating purposes.

9 Claims, 5 Drawing Figures

WASTE WATER HEAT RECOVERY APPARATUS

TECHNICAL FIELD

This invention generally pertains to the field of systems for recovering heat from waste liquids in homes and industry, and to related equipment, such as heat exchangers.

BACKGROUND ART

The rapidly increasing cost of energy emphasizes the need for greater conservation of the energy consumed by both industrial and domestic heating equipment. For example, in home domestic hot water and water space heating equipment, various expedients, such as improving the efficiency of combustion and providing greater insulation to water heating tanks, have been employed to increase the efficiency of the equipment. However, for the water utilized in domestic and industrial hot water systems, a good deal of the energy invested in heating the water is lost when the heated water is discharged to a drain after being used for washing or bathing. In these last mentioned uses, it is not necessary that the heat contained in the water be extracted as it is in space heating; rather, the water is heated primarily because of efficiency in washing. Thus, the energy remaining in the used wash water, which often will be at a temperature substantially above ambient, will be lost in usable form when the waste water is discharged to the sewers. Some attempt has been made to utilize the heat contained in waste water for other purposes. For example, waste hot water can be simply stored in tanks to allow the water to loose its heat to the surrounding atmosphere. Similarly, the unwanted heat contained in fresh cows milk has been transferred through heat exchange apparatus to provide heat to the milking parlor. Howeverm such systems are not suitable for efficiently recycling the heated water through a domestic hot water system in an economical manner.

DISCLOSURE OF THE INVENTION

The present invention recycles a substantial portion of the heat contained in waste water to raise the temperature of incoming fresh water and thereby reduce the amount of energy which must be expended to raise the temperature of the water to the desired level. Appropriate sources of waste water include the water used for washing and bathing in homes and commercial facilities—such as apartment buildings, restaurants, hotels, hospitals, and dormitories—and hot water used in various operations in industrial plants. In addition to recycling the heat in waste water for further use in washing, the apparatus of the invention can also be integrated with a hot water space heating system to allow the energy from the waste water to be utilized in the heating system, or, conversely, to use heat from recirculated space heating system water to preheat the water used in the domestic hot water supply.

Hot water from the domestic hot water supply heater is, after use in washing operations and so forth, discharged into drain pipes which are separated from drains for toilets and other uses wherein cold water is generally used. The warm waste water is directed to a heat exchange unit which extracts heat from the waste water to raise the temperature of incoming fresh water. In the apparatus of the invention, the flow of waste water to the heat exchanger can be regulated by the use of an insulated storage tank with a thermostatically controlled valve at its outlet which directs waste water to the heat exchanger only when the water is above a certain temperature; and in addition, a flow control unit diverts the flow of waste water from the storage tank to a sewer drain when the water is flowing at rates that cannot be reasonably handled by the heat exchanger after the storage tank has been filled.

In buildings having a hot water heating system, the heat exchanger may be connected to receive water from the radiators and redeliver it to the furnace so that the cooled water from the radiators is circulated through the heat exchanger. In this manner, when the heat contained within the waste water is not being utilized to heat the domestic hot water supply, it can be utilized to preheat the water which is transferred to the furnace for space heating purposes. Conversely, where the demand for heat from the radiators is less than the heat contained within them, the heating system water can be circulated through the heat exchanger and can thereby transfer some of this heat to the incoming supply water.

The heat exchanger transfers the heat from the waste water to an intermediate transfer medium, wherein the heat is stored for a period of time until needed, and thence to the incoming supply water. In accordance with the present invention, it has been discovered that these functions are most advantageously performed where the heat exchanger maintains a temperature gradient in the transfer medium liquid, with the highest temperature near the inlet of the waste water to the heat exchanger and the lowest temperature at the outlet of the waste water, and, conversely, with the coolest temperature of the transfer medium at the inlet of the supply water and the highest temperature of the transfer medium at the outlet of the supply water. In this manner the waste water is gradually cooled as it passes through the heat exchanger while the supply water is gradually warmed; as a result, there will be a relatively constant temperature differential existing at any point in the heat exchanger between the waste water and the transfer medium and between the supply water and the transfer medium. In one embodiment, the heat exchanger is formed of a cylindrical, insulated container vessel in which the conduits for the waste water and the incoming supply water are formed in paralleling helical tracks which spiral from top to bottom within the container vessel, with the waste water being run from a top inlet to a bottom outlet and the supply water being run in the opposite direction. Circulating water from the hot water space heating equipment may also be run through an optional third helical conduit. A helical spacer baffle is mounted within the vessel to separate each turn of the helical conduits, thereby resulting in a continuous temperature gradation of the water along the baffle from warmest at the top of the vessel to coolest at the bottom. Flat baffle plates may be mounted to extend radially between adjacent turns of the helical baffle so as to divide the volumes between adjacent turns of the helical baffle into a series of compartments and thereby reduce convection, conduction and radiation mixing of the transfer medium liquid within the vessel. The heat exchanger may also be formed as a series of discrete compartments in which transfer medium at different temperatures is stored, with the warm waste water and cool supply water being run on parallel conduits through each of the compartments but in opposite directions. A similar effect may be obtained by providing a linear vessel or tube in which the transfer medium is contained, with the waste water and supply water conduits extending linearly therethrough, combined with baffles which divide the tube into individual compartments.

Further objects, features and advantages of the invention will be apparent from the following detailed description taken in conjunction with the accompany drawings showing preferred embodiments of the invention.

BEST MODE FOR CARRYING OUT THE INVENTION

Figure 1:
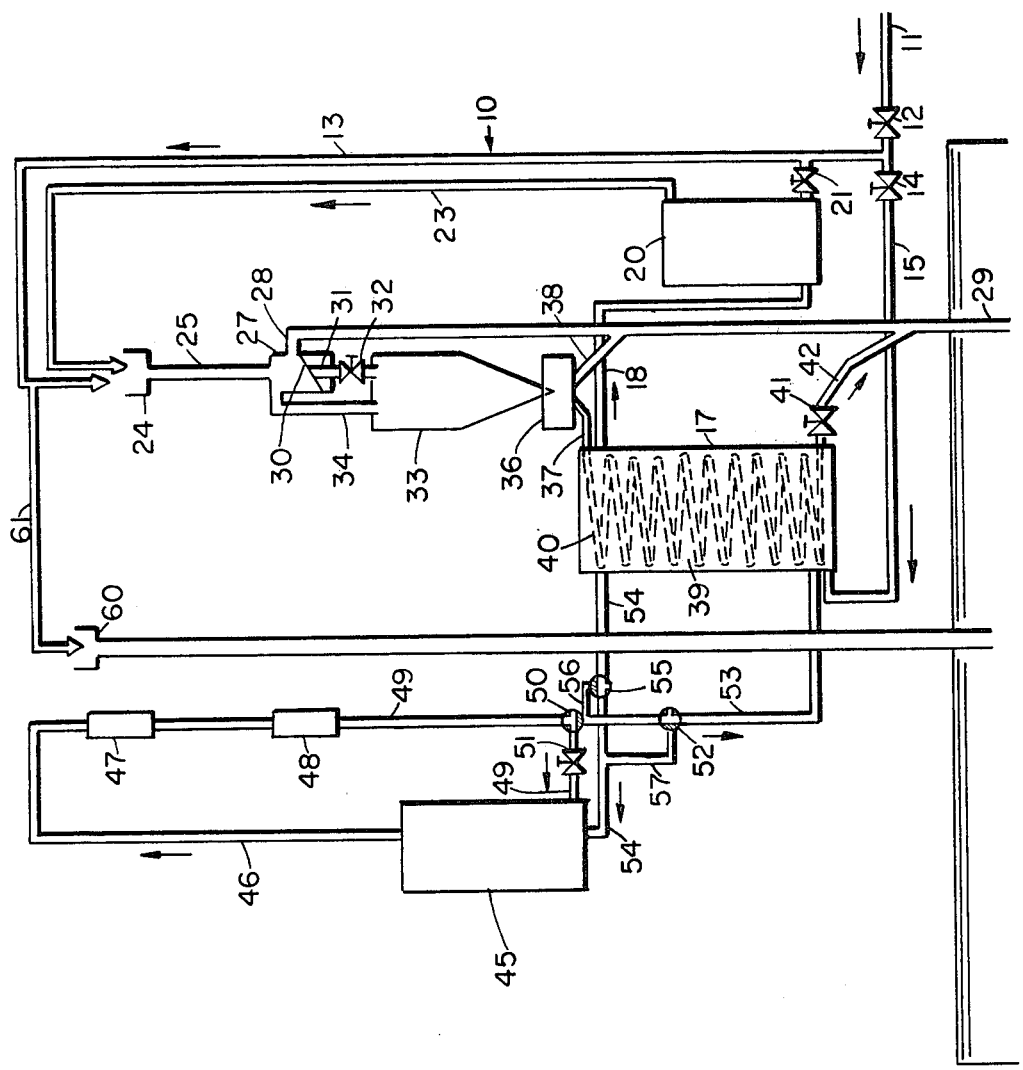
FIG. 1 is a somewhat simplified schematic view of the waste water heat recovery apparatus of the invention.

With reference to the drawings, a preferred embodiment of the waste water heat recovery apparatus as employed in a home or other building is shown generally at 10 in schematic form in FIG. 1. Incoming fresh supply water from a water main 11 passes through the main water shut off valve 12 for the building and is thence directed on a first branch 13 to the cold water supply pipes of the house and through a shut-off valve 14 to a supply line 15 which supplies the hot water heating system of the building. The incoming fresh water on the line 15 passes through a heat exchanger unit 17 to an output line 18 and thence to a water heater 20. The water heater also optionally receives water directly from the cold water supply line 13 through a bypass control valve 21. The output from the hot water heater 20 is directed to the hot water pipes 23 of the home from which the hot water is delivered to the point of use 24 such as bath tubs, sinks, dishwasher, laundry, etc. Although the system is described herein for use in a home, it is apparent that the system can also be utilized in commercial developments such as office buildings and apartments, and in industrial situations where hot water is used for purposes such as washing in which the heat content of the water is not substantially extracted during use.

In a typical plumbing system, the hot water from the supply line 23 may be mixed with the cold water from the line 13, since it is rare that hot water is used directly for such purposes as personal bathing, and the hot water may also be used at the temperature at which it is delivered by the hot water heater, as in dishwashing and clothes washing. The waste water may thus be at various temperatures from near the temperature of the hot water tank (e.g., 130°-160° F.) to some lesser temperature relecting a mixture of hot and cold water (80° F. to 110° F.). The waste water is delivered through a waste water drain pipe 25, separated from the sanitary drain pipes for toilets and, preferably, disposals, to an automatic flow control unit 27. The flow control unit functions to prevent excess flow from being delivered to the heat exchanger during peak periods, and is connected to an overflow outlet pipe 28 which discharges directly to the sewer system through a drain pipe 29 if an overflow condition occurs. The unit 27, as shown in a simplified view in FIG. 1, has a cylindrical housing having a sieve plate 30 mounted diagonally therein to separate the solids within the waste water and hold them for later removal, with the liquid portion of the waste water being discharged through a stand pipe 31 under the sieve 30. The pipe 31 delivers the strained waste water through a control valve 32 to an insulated warm water storage tank 33. A vent pipe 34 extends from the top of the tank 33 to provide a vent to the atmosphere and thereby allow free flow of the liquid contained within the storage vessel. The use of the tank 33 for storage of the warm waste water is optional although highly desirable, since it allows a controlled rate of flow of warm water to the heat exchanger so that the heat exchange rate can be optimized. If the storage tank 33 becomes filled to capacity, additional flow of waste water will be diverted by the flow control unit 27 to the overflow pipe 28. The walls of this tank are highly insulated to prevent excess loss of heat during storage. A commercially available thermostatically controlled valve 36 is mounted at the bottom of the tank 33 and is controlled by an internal thermostat which measures the temperature of the water coming into the valve. Waste water above a selected temperature (e.g., 80° F.) is switched to a transfer line 37 leading to the heat exchanger 17, whereas water below the selected temperature is switched by the valve 36 into a discharge line 38 which leads to the drain pipe 29. In this manner, excessively cool water will not be run into the heat exchanger since to do so would result in a net removal of heat from the liquid transfer medium 39 within the heat exchanger.

The heat exchanger 17 is shown in a schematic view in FIG. 1, in which only the one helical conduit 40 which carries waste water is shown. This conduit outlets from the heat exchanger through a shut-off valve 41 to a discharge line 42 leading to the drain pipe 29.

Hot water space heating systems can optionally be integrated with the above described waste water heat recovery apparatus to preheat the water supplied to the heating system as well as to divert some of the heat from the heating system into the waste water recovery system when appropriate. A schematic view is shown of such a heating system having a boiler 45, or other suitable water heating device, which delivers hot water through a delivery line 46 to radiators 47 and 48, with the cooled water being returned via a recovery line 49 through a three way valve 50 and a shut-off valve 51 to the boiler 45. During normal operation—with the valve 50 in the position shown in FIG. 1—the cooled water would recirculate back to the boiler. However, if the temperature of the heat transfer medium 39 within the heat exchanger 17 were greater than the temperature of the water returned through the line 49, the valve 50 may be switched to direct the circulating water through a three-way valve 52 and a bypass pipe 53 to the bottom of the heat exchanger unit 17. The water is passed through a conduit (not shown in FIG. 1) immersed in the transfer medium, and exits from an outlet at the top of the heat exchanger to a return line 54 through a three-way valve 55 and back to the boiler 45. In this manner, the water supplied to the boiler would be somewhat preheated so that less energy would be required to raise the water to the desired temperature.

The system may also be set up to operate such that water returning through the line 49 may be directed to the heat exchanger 17 when the load on the boiler has temporarily decreased. In this manner, the relatively warmer water within the line 49 will warm the transfer medium and thereby extract some of the heat from the returning radiator water which would otherwise be simply wasted as the water sat in the return lines. The change in direction of radiator water flow is effected by switching the valve 55 such that water from the radiator passes from the valve 50 through a stub line 56 to the valve 55, and thence through the line 54 to the heat exchanger 17. The radiator water is returned from the heat exchanger through the line 53 by switching the valve 52 so that the water is diverted through a stub line 57 to the portion of the line 54 leading to the boiler.

For purposes of illustration in FIG. 1, the drains 60 that primarily receive cold water from a supply line 61, unmixed with hot water, are shown discharging directly to the sewer system. In a residential household, such uses of water may be the toilets, garbage disposal, water softener drain and so forth.

Figure 2:
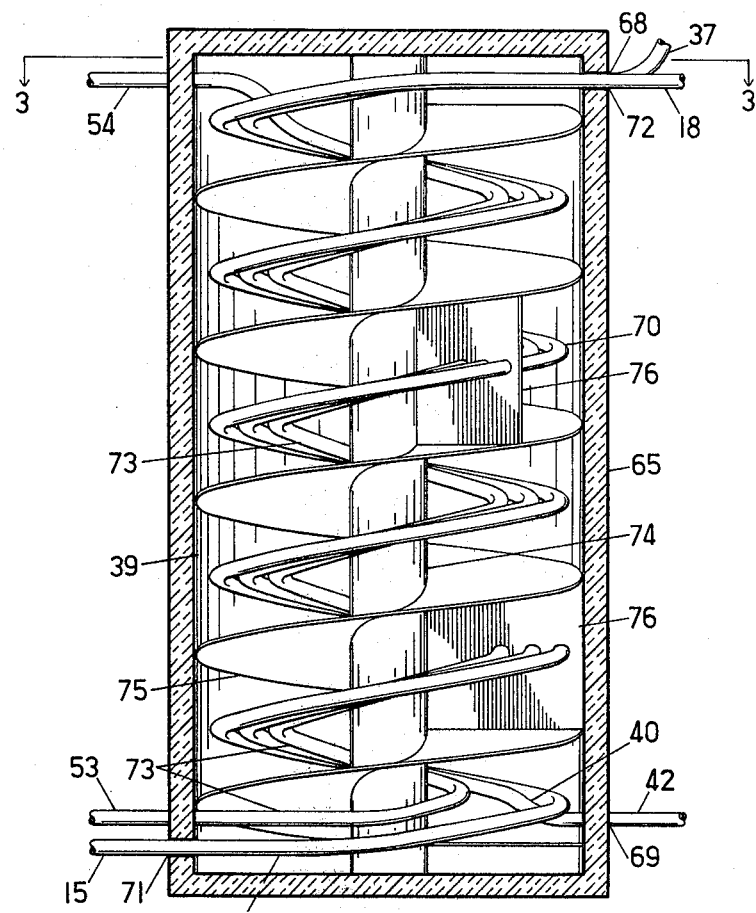
FIG. 2 is a partial cross-sectional view of the heat exchanger portion of the apparatus of FIG. 1.
Figure 3:
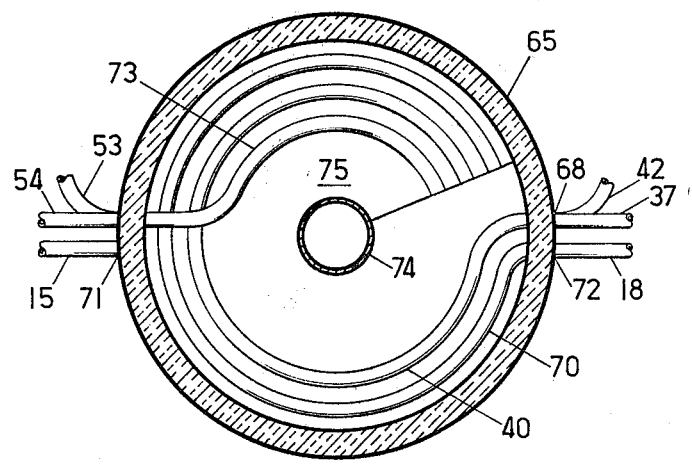
FIG. 3 is a top cross-sectional view of the interior of the heat exchanger of FIG. 2 taken along the lines 3—3 of FIG. 2.

A more detailed view of a specific embodiment of a heat exchanger 17 in accordance with the invention is shown generally in the views of FIGS. 2 and 3. FIG. 2 is a view of the heat exchanger with a portion of the walls thereof broken away, showing a substantially cylindrical container vessel 65, having walls formed of a heat insulating material such as fiberglass or foamed plastic, and an interior which is filled with a heat transfer medium 39 having a high heat capacity, with water ordinarily being suitable. The waste water conduit 40 extends from an inlet 68 at the top of the vessel through a helical path to an outlet 69 at the bottom of the vessel. Preferably, the conduit 40 is formed of a relatively good heat conductor which is resistent to corrosion, such as copper. Additionally, a second heat conductive conduit 70 carries the incoming supply water from an inlet 71 at the bottom of the vessel to an outlet 72 at the top. The supply water conduit 70 also is a good conductor and is formed in a helical shape generally paralleling the waste water conduit 40. The two conduits may be spaced apart as shown, or they may be in contact. However, it is preferred that the transfer of heat be primarily first from the waste water conduit 40 to the transfer medium 39, and thence from the transfer medium to the supply water conduit 70. An optional third helical, heat conductive conduit 73 may be mounted generally parallel to the conduits 40 and 70 to carry the circulating radiator water from the bypass pipe 53 to the return line 54, or vice versa.

Mounted within the vessel 65 is a central cylindrical core member 74 upon which is mounted a helical baffle 75 which extends from the bottom to the top of the vessel between each turn of the conduits 40 and 70. The helical baffle also extends from the inner cylindrical wall of the vessel 65 to the outer wall of the central core 74 to effectively divide the interior of the vessel into a helical chamber which contains the helical conduits 40, 70 and 73. The baffle 75 may be formed of various materials, such as plastic or metal, and is preferably heat insulating, although it may be heat conductive since it serves the primary purpose of minimizing the convection mixing of cooler water at the bottom of the vessel with warmer water at the top. As a result, as warm waste water is discharged into the conduit 40 at the inlet end 68, the portion of the transfer medium 39 which is near the top of the vessel will gain the most heat, since it is in contact with the hottest water. As the waste water in the conduit 40 descends toward the outlet 69, it gradually looses heat to the surrounding transfer medium, and therefore the transfer medium at the bottom of the vessel will have the lowest temperature since it is adjacent to the lowest temperature waste water. Because of natural convection within the helical chamber defined between the successive turns of the baffle 75, the transfer medium water stored within the vessel will eventually mix by convection through the chamber. Conduction across the baffle between adjacent turns in the chamber will also tend to reduce the temperature gradation, although the conduction can be minimized by utilizing an insulating baffle, such as one formed of foamed plastic or sponge type material.

To minimize the convection mixing that occurs over a period of time within the helical chamber, a plurality of flat, radial baffle plates 76 are mounted within the vessel and extend from the outer wall of the central core 74 to the inner wall of the vessel 65 and break up the large helical chamber into a series of compartments having the shape of a portion of a helix. The baffles 76 may completely block the channel formed between adjacent turns of the baffle 75, the inner walls of the vessel 65, and the outer walls of the central core 74; or the baffles may just partially block the channel so that convection is reduced although not eliminated. For some purposes, it is desirable to allow flow to occur through the helical channel, as when the transfer medium water is being drained and replaced. As shown in FIG. 2, the conduits 40, 70 and 73 may pass through openings in the baffle plates 76 and be supported by the baffle plates. For simplicity of illustration, only two baffle plates 76 are shown in FIG. 2, although it should be understood that many plates would ordinarily be utilized—e.g., four baffle plates per helical turn has been found satisfactory for a cylindrical vessel approximately one foot wide.

When the baffles 76 are not used, a continuous temperature gradient will be created in the transfer medium water adjacent the helical conduit 40 as hot waste water passes through it. The maintenance of such a temperature gradient results in the efficient transfer of heat since the relatively warm waste water initially coming in through the inlet 68 is adjacent to the relatively warm transfer medium water, while the cooler water in the conduit 40 toward the bottom of the vessel is adjacent transfer medium water which is commensurately cooler. Similarly, because the supply water is introduced at the bottom of the vessel, at the inlet 71, the transfer medium water adjacent to the conduit 70 near the bottom of the vessel will be relatively cool although still higher than the temperature of the supply water. As the supply water rises through the helical conduit, and rises in temperature as it picks up heat from the transfer medium, the adjacent transfer medium water also rises in temperature commensurately, so that a relatively constant temperature difference exists between the water in the supply conduit and the adjacent transfer medium water. The net result of this gradation of the temperature of the transfer medium water within the vessel is to allow the water which exits from the supply line at the outlet 72 to be at a higher temperature than could be achieved if the transfer medium water were uniformly mixed within the vessel. It is apparent that uniform mixing of the transfer medium water would result in a water temperature which would be between the temperature of the transfer medium water in the bottom of the vessel 65 and the temperature of the transfer medium water at the top of the vessel 65.

The interposition of the radial baffles 76 converts the continuous temperature gradient within the helical chamber into a series of discrete temperature changes between the compartments divided by the radial baffles. However, within each compartment there will be a degree of continuous temperature variation and the use of a sufficiently large number of baffles 76 will result in relatively small increments in temperature between adjacent compartments. Of course, as the number of compartments separated by the baffles 76 increases, the resulting system resembles a continuous temperature gradient system, but one in which there is minimal convection mixing so that the gradient is maintained.

Figure 4:
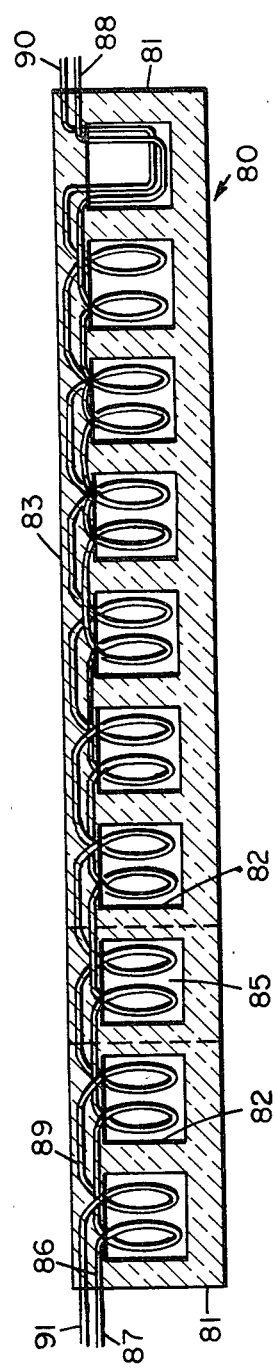
FIG. 4 is a modified embodiment of a heat exchanger in accordance with the invention which includes discrete compartments to provide gradation in temperature of the transfer medium.

A modified embodiment of a heat exchanger which can be utilized in the apparatus of FIG. 1 is shown generally at 80 in cross-section in FIG. 4. The heat exchanger 80 includes a rectangular box formed of walls 81 of insulating material having interior spacer walls 82 which divide the interior of the heat exchanger into a series of separated compartments. A top wall 83 of the heat exchanger closes off and insulates the compartments from the ambient atmosphere. Each of the compartments is filled with a high heat capacity transfer medium 85, such as water. A waste water conduit 86 passes from an inlet 87 at one end of the heat exchanger and coils through each of the compartments to the opposite end of the heat exchanger at an outlet 88. A supply water conduit 89 enters the heat exchanger at an inlet 90 located at the end of the heat exchanger at which the waste water outlet 88 is located, and coils through each of the chambers generally paralleling the path of the waste water conduit 86 to exit at an outlet 91 adjacent to the inlet 87 of the waste water conduit. Since the waste water generally flows only under gravity pressure, the heat exchanger 80, although shown horizontally in FIG. 4, could be disposed vertically or at an angle—with the inlet 87 being high and the outlet 88 of the waste water conduit being low. Alternatively, if waste water is forced under pressure through the heat exchanger, the exchanger can be disposed horizontally as shown. The pressure head provided by waste water in supply pipes above the heat exchanger may be sufficient to maintain flow through the heat exchanger.

The heat exchanger 80 functions in a manner which is analogous to the functioning of the heat exchanger 17, although being formed in a substantially different structure. The passage of the warm waste water through the conduit 86 will cause the heat transfer medium in each of the compartments to be warmed. Since the waste water enters at the inlet 87, the heat transfer water in the compartment closest to the inlet will be the warmest, with the temperature of the water in each successive compartment advancing toward the outlet end 88 being successively cooler. Since each compartment is blocked from the others, there will exist discrete temperature differences between each of the compartments. As the number of compartments increases, it can be seen that the gradation in temperature between the transfer medium in each of the compartments decreases, and, of course, in the limit would approach a continuous gradient. The conduits 86 and 89 are shown passing through the top wall 83 of the heat exchanger 80, although it is apparent that they could be as readily passed through the spacer walls 82 which divide the chambers. In the construction of the heat exchanger 80, it is preferred that the spacer walls 82 be formed of heat insulating material so that the temperature gradient between adjacent compartments can be maintained as long as possible, although the system can still function even if the walls are conductive since a relatively slow conduction of heat will occur across the various compartments, and since mixing of the water in the compartments by convection cannot take place.

Figure 5:
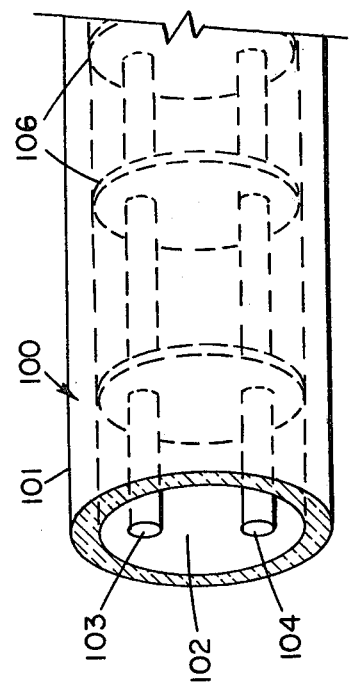
FIG. 5 is a further modified embodiment of a heat exchanger in accordance with the invention which is formed as a linear tube.

Another embodiment for a heat exchanger which can be utilized in the system of FIG. 1, as well as in related plumbing systems wherein a transfer of heat between separated water systems is to occur, is shown generally at 100 in FIG. 5. The heat exchanger 100 includes an outer tube 101 formed of an insulating material such as foamed plastic or rubber, or a tube of standard plumbing material such as polyvinyl chloride surrounded by an insulator such as fiberglass. The interior of the tube 101 is filled with a heat transfer liquid 102, such as water, and a heat conductive waste water conduit 103 runs through the length of the tube immersed within the water 102. Similarly, a second conductive conduit 104 for delivery of supply water also runs through and is immersed in the water within the tube 101. The conduits 103 and 104 are held away from the sides of the tube 101 by a series of spacer baffles 106 which are mounted within the interior of the tube and have a circular periphery, with each of the conduits 103 and 104 running through the baffles 106 and being held by them. These baffles not only serve to mount the conduits, but also divide the interior of the tube 101 into a plurality of individual compartments which contain the heat transfer water.

With passage of warm waste water through the conduit 103, each of the individual compartments formed between each pair of baffles 106 will be at a temperature slightly different from the temperature of the next adjacent compartment, with the temperature of each compartment decreasing successively from the end of the tube at which waste water enters toward the end of the tube at which the waste water exits. The incoming cold supply water enters the supply line 104 at the exit end of the waste water so that it is initially passed through the compartments containing the coolest heat transfer water and progressively moves toward the compartments containing the warmest heat transfer water. The heat exchange structure 100 functions in a manner entirely analogous to that of the heat exchanger 80 or the heat exchanger 17. It is apparent that the conduits 103 and 104 can be formed in a spiral or helical pattern through the tube 101, if desired, thereby resulting in a longer transient distance for both the waste water and supply water, and a corresponding longer time for heat transfer between the water in these conduits and the surrounding transfer medium water. It is also apparent that the baffle within the tube 101 may take the form of a single helical baffle—similar to the baffle 75 within the heat exchanger 17—which would run the length of the tube 101, with the conduits 103 and 104 either spiraling between the helical baffle or passing through the baffle and being supported by it. The use of a spiral baffle will result in a continuous gradient of temperature within the tube 101 from the input end of the waste water conduit 103 to its output end, similar to the continuous gradient that may be formed within the vessel 65 in the chamber defined between the adjacent turns of the baffle 75.

It is understood that the invention is not confined to the particular construction and arrangement of parts herein illustrated and described, but embraces all such modified forms thereof as come within the scope of the following claims.

I claim:

1. Waste water heat recovery apparatus for a building comprising:
   (a) a hot water heater delivering hot water to hot water supply pipes;
   (b) a waste water drain pipe receiving hot water from the hot water supply pipes after use;
   (c) a heat exchanger having an interior chamber filled with a heat transfer liquid having a high heat capacity, a waste water conduit extending through the heat transfer liquid in the heat exchanger and connected to receive at an inlet end the waste water from the waste water drain pipe and discharging waste water at an outlet end, a supply water conduit having an inlet adjacent the outlet of the waste water conduit at which it receives fresh supply water and extending through the heat transfer liquid generally parallel to the waste water conduit up to an outlet, and means for maintaining a temperature gradient in the heat transfer liquid along the waste water and supply water conduits between the inlet and outlet ends of the waste water conduit;
   (d) an output line connecting the outlet of the supply water conduit to the hot water heater;
   (e) a discharge line connecting the outlet of the waste water conduit to a sewer drain pipe.

2. The waste water heat recovery apparatus of claim 1 including thermostatically operated control valve means connected to receive waste water from the waste water drain pipe and responsive to temperature of the waste water and also connected to a pipe leading to the inlet of the waste water conduit in the heat exchanger and to a pipe leading to a sewer drain pipe, for switching the flow of waste water to the waste water conduit in the heat exchanger when the waste water is above a preselected temperature, and to direct the waste water to the pipe leading to the sewer drain when the waste water is below the preselected temperature.

3. The waste water heat recovery apparatus of claim 2 including a warm water storage tank having insulated walls connected to receive waste water from the waste water drain pipe and having an outlet connected to deliver waste water to the temperature responsive control valve means.

4. The waste water heat recovery apparatus of claim 3 including waste water automatic flow control means, connected to receive waste water from the waste water drain pipe and to deliver waste water to the storage tank and also connected to the sewer drain, for filtering solids from the waste water passed to the storage tank and to divert waste water to the sewer drain when the storage tank is completely filled with waste water.

5. The waste water heat recovery apparatus of claim 1 in combination with a water heating unit for space heating, a radiator for delivering the heat from the water heated by the heating unit to the space to be heated, a hot water delivery line connecting the heating unit to the radiator to deliver hot water thereto and a recovery line connected to return the water from the radiator to the heating unit, and further including a bypass pipe connected to the recovery line and leading to a heat conductive conduit immersed in the heat transfer liquid in the heat exchanger, a return line connected to the heat conductive conduit to receive the water therefrom and return it to the heating unit for heating and delivery to the radiators, a control valve connected in the recovery line and to the bypass pipe which normally delivers water from the radiators to the heating unit and which is switchable to transfer the flow of water from the radiator through the bypass pipe to the heat exchanger and back to the heating unit through the return line.

6. The waste water heat recovery apparatus of claim 5 further including a three-way control valve connected in the return line and connected by a stubline to the bypass pipe and another three-way control valve connected in the bypass pipe and connected by a stubline to the return line, whereby the three-way valves can be switched so as to cause water from the radiators to flow through the return line to the heat exchanger and out of the heat exchanger through the bypass pipe to reverse the direction of flow in the heat exchanger.

7. The waste water heat recovery apparatus of claim 1 wherein the heat exchanger includes a cylindrical, insulated container vessel having a cylindrical interior chamber filled with heat transfer liquid, and wherein the waste water conduit and supply water conduit are formed as helixes running generally parallel to one another from the top of the cylindrical container vessel to the bottom thereof, with the waste water conduit having an inlet at the top of the vessel and an outlet at the bottom and the supply conduit having an inlet at the bottom of the vessel and an outlet at the top thereof, and wherein the means for maintaining a temperature gradient in the heat transfer liquid comprises a helical baffle plate extending from the top of the vessel to the bottom and separating adjacent turns of the helically shaped waste water conduit and supply water conduit, and a central cylindrical core mounted in the middle of the cylindrical interior of the container vessel, with the helical baffle extending from the outer wall of the cylindrical core to the inner cylindrical wall of the container vessel to thereby inhibit convection mixing of heat transfer liquid from the bottom to the top of the vessel.

8. The waste water heat recovery apparatus of claim 7 further including radial baffle plates mounted in the helical chamber defined between the turns of the helical baffle and extending from the outer wall of the central core to the inner wall of the cylindrical container vessel to divide the helical chamber into a plurality of individual compartments, thereby further inhibiting the convection mixing of heat transfer liquid within the container vessel.

9. The waste water heat recovery apparatus of claim 8 wherein the helical baffle and the radial baffles are formed of a heat insulating material to inhibit conduction transfer of heat across the baffles between heat transfer liquid in adjacent compartments.

* * * * *